United States Patent
Suchy et al.

(10) Patent No.: US 11,678,125 B2
(45) Date of Patent: *Jun. 13, 2023

(54) MULTICHANNEL MINIMUM DISTANCE CHIRP ECHO DETECTION

(71) Applicant: SEMICONDUCTOR COMPONENTS INDUSTRIES, LLC, Phoenix, AZ (US)

(72) Inventors: Tomas Suchy, Brno (CZ); Pavel Kostelnik, Bordovice (CZ); Marek Hustava, Bratislava (SK)

(73) Assignee: SEMICONDUCTOR COMPONENTS INDUSTRIES, LLC, Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/855,118

(22) Filed: Jun. 30, 2022

(65) Prior Publication Data

US 2022/0337957 A1 Oct. 20, 2022

Related U.S. Application Data

(63) Continuation of application No. 17/156,742, filed on Jan. 25, 2021, now Pat. No. 11,405,730.

(60) Provisional application No. 62/704,408, filed on May 8, 2020.

(51) Int. Cl.
 *H04R 25/00* (2006.01)
 *H04R 17/00* (2006.01)

(52) U.S. Cl.
 CPC .................................. *H04R 17/00* (2013.01)

(58) Field of Classification Search
 CPC ...... G10L 15/20; G10L 15/22; G10L 21/0232; G10L 2015/223; G10L 2021/02082
 See application file for complete search history.

(56) References Cited

U.S. PATENT DOCUMENTS

| | | | |
|---|---|---|---|
| 6,573,732 B1 | 6/2003 | Reimer | |
| 7,957,223 B2 | 6/2011 | Hafer et al. | |
| 9,945,946 B2 * | 4/2018 | Dokmanic | ................ G01S 3/74 |
| 11,405,730 B2 * | 8/2022 | Suchy | ..................... G01S 7/529 |
| 2013/0235700 A1 | 9/2013 | Koudar | |
| 2014/0331772 A1 | 11/2014 | Klotz et al. | |
| 2019/0212423 A1 | 7/2019 | Hustava et al. | |
| 2020/0200898 A1 | 6/2020 | Hustava et al. | |

* cited by examiner

*Primary Examiner* — Amir H Etesam
(74) *Attorney, Agent, or Firm* — Ramey LLP

(57) ABSTRACT

One implementation of a sensing method includes: correlating a receive signal with a waveform template to obtain a correlation signal in which echoes would be represented as peaks; and varying the waveform template based on time elapsed from a measurement start time.

19 Claims, 5 Drawing Sheets

MULTICHANNEL MINIMUM DISTANCE CHIRP ECHO DETECTION

CROSS-REFERENCE TO RELATED APPLICATIONS

The present application is a continuation of U.S. patent application Ser. No. 17/156,742, titled "Multichannel minimum distance chirp echo detection" and filed 2021 Jan. 25, which claims priority to provisional U.S. Application 62/704,408, titled "Dual channel chirp in park assist sensors" and filed 2020 May 8 by inventors Tomas Suchy, Pavel Kostelnik, and Marek Hustava. This application further relates to U.S. pplication Ser. No. 15/868,801, titled "Low frequency modulated chirp minimum distance measurement" and filed 2018 Jan. 11 by inventors Marek Hustava and Tomas Suchy. The foregoing applications are hereby incorporated herein by reference.

BACKGROUND

Modern automobiles are equipped with an impressive number and variety of sensors. For example, cars are now routinely equipped with arrays of acoustic sensors to monitor the distance between the car and any nearby persons, pets, vehicles, or obstacles. Due to environmental noise and safety concerns, each of the sensors may be asked to provide tens of measurements each second while the car is in motion. As the number of sensors increases, so too does the opportunity (and need) for the sensors to operate concurrently to more efficiently monitor the space around the vehicle. Because acoustic bursts from multiple sensors may be "in flight" at the same time, the echoes from bursts by a given sensor may be detected by other sensors. Different frequency bands ("channels") may be used to enable the bursts sent by different sensors (and their associated echoes) to be distinguished from each other, but raise certain difficulties with measurement accuracy if the sensors have frequency-dependent responses.

SUMMARY

Accordingly, there are disclosed herein various sensor arrays, sensor controllers, and sensing methods suitable for use in a multi-channel acoustic sensor array such as those used in systems for parking assistance, blind spot monitoring, and driver assistance. One illustrative implementation of a sensing method includes: correlating a receive signal with a waveform template to obtain a correlation signal in which echoes would be represented as peaks; and varying the waveform template based on time elapsed from a measurement start time.

An illustrative implementation of an integrated circuit controller for a multichannel sensor includes: a transmitter to drive a piezoelectric transducer to generate acoustic bursts; a receiver to obtain a receive signal from the piezoelectric transducer after each acoustic burst is generated; and a processing circuit coupled to the transmitter and to the receiver, the processing circuit configured to apply echo-detection processing to said receive signal, said processing including: correlating a receive signal with a waveform template to obtain a correlation signal in which echoes would be represented as peaks; and varying the waveform template based on time elapsed from a measurement start time.

Each of these illustrative implementations may be employed individually or conjointly, together with one or more of the following optional features in any suitable combination: 1. scaling the channel correlation signal based on time elapsed from a measurement start time. 2. varying the waveform template includes decreasing a bandwidth of the template based on time elapsed from the measurement start time. 3. scaling the correlation signal to compensate for a transducer response to the waveform tails. 4. the waveform template represents an up-chirp. 5. the waveform template represents a down-chirp. 6. the measurement start time is a debounce interval after a detected end of reverberation. 7. downconverting the receive signal to zero intermediate frequency (ZIF) before said correlating with the waveform.

NOMENCLATURE

The use of the terms "approximately" or "substantially" mean that a value of an element has a parameter that is expected to be close to a stated value. However, as is well known in the art, there may be minor variations that prevent the values from being exactly as stated. Accordingly, anticipated variances, such as 10% differences, are reasonable variances that a person having ordinary skill in the art would expect and know are acceptable relative to a stated or ideal goal for one or more embodiments of the present disclosure. It is also to be appreciated that the terms "first", "second", "next", "last", "before", "after", and other similar terms are used for description and ease of reference purposes only and are not intended to be limiting to any configuration of elements or sequences of operations for the various embodiments of the present disclosure. Further, the terms "coupled", "connected" or otherwise are not intended to limit such interactions and communication of signals between two or more devices, systems, components or otherwise to direct interactions—indirect couplings and connections may also occur.

DETAILED DESCRIPTION

It should be understood that the following description and accompanying drawings are provided for explanatory purposes, not to limit the disclosure. That is, they provide the foundation for one of ordinary skill in the art to understand all modifications, equivalents, and alternatives falling within the scope of the claims. More specifically, though the following description uses vehicles as an illustrative usage context, the disclosed principles and techniques are applicable to other usage contexts such as traffic monitoring, parking spot occupancy detection, and distance measurement.

Figure 1:
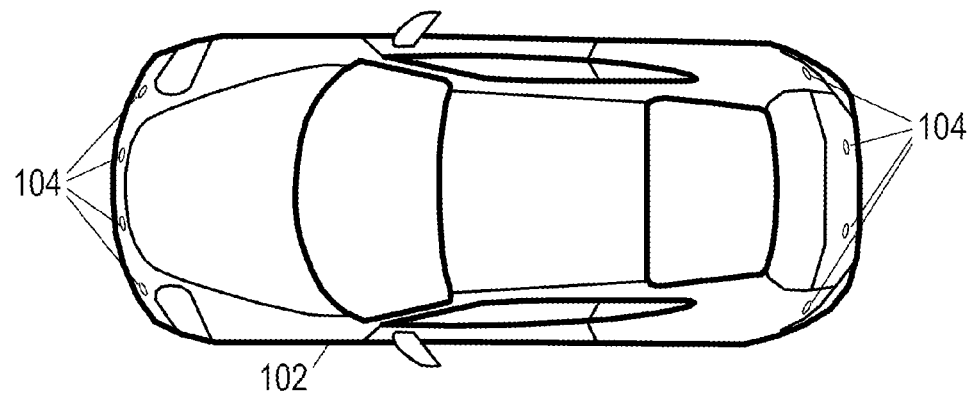
FIG. 1 is an overhead view of an illustrative vehicle equipped with parking-assist sensors.

To provide context, FIG. 1 shows an illustrative vehicle 102 equipped with a set of ultrasonic parking-assist sensors 104. The number and configuration of sensors in the sensor arrangement varies, and it would not be unusual to have six sensors on each bumper with two additional sensors on each side for blind-spot detectors on each side. The vehicle may employ the sensor arrangement for detecting and measuring distances to objects in the various detection zones, using the sensors for individual measurements as well as cooperative (e.g., triangulation, multi-receiver) measurements.

The ultrasonic sensors are preferably transceivers, meaning that each sensor can transmit and receive bursts of ultrasonic sound. Emitted bursts propagate outward from the vehicle until they encounter and reflect from an object or some other form of acoustic impedance mismatch. The reflected bursts return to the vehicle as "echoes" of the emitted bursts. The times between the emitted bursts and received echoes are indicative of the distances to the reflection points. In many systems, only one sensor transmits at a time, though all of the sensors may be configured to measure the resulting echoes. However, the present disclosure provides a way to support multiple simultaneous transmissions through the use of different frequency bands for those sensors transmitting into overlapping detection zones.

Figure 2:
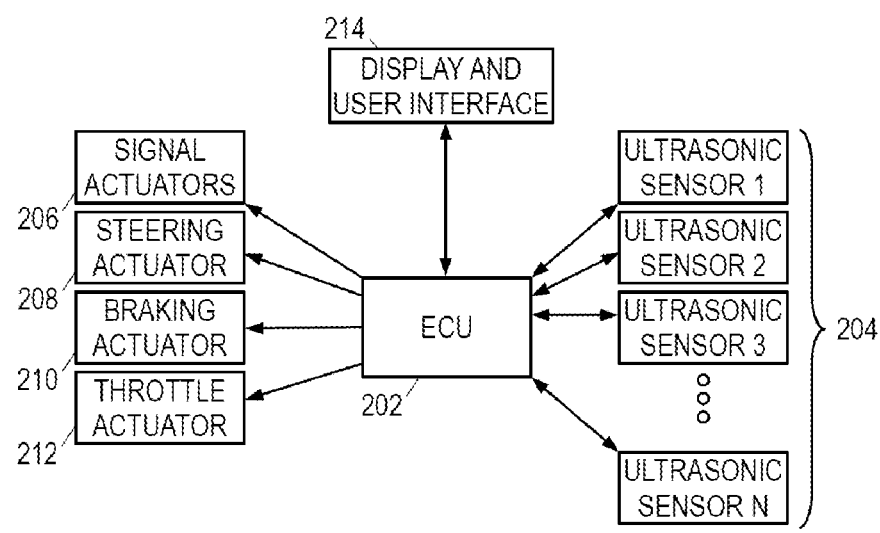
FIG. 2 is a block diagram of an illustrative parking assist system.

FIG. 2 shows an electronic control unit (ECU) 202 coupled to the various ultrasonic sensors 204 as the center of a star topology. Other sensor array topologies including serial, parallel, and hierarchical (tree) topologies, are also suitable and contemplated for use in accordance with the principles disclosed herein. To provide automated parking assistance, the ECU 202 may further connect to a set of actuators such as a turn-signal actuator 206, a steering actuator 208, a braking actuator 210, and throttle actuator 212. ECU 202 may further couple to a user-interactive interface 214 to accept user input and provide a display of the various measurements (including the presence of, and/or distance to, nearby objects) and system status. Using the interface, sensors, and actuators, ECU 202 may provide automated parking, assisted parking, lane-change assistance, obstacle and blind-spot detection, and other desirable features.

Figure 3:
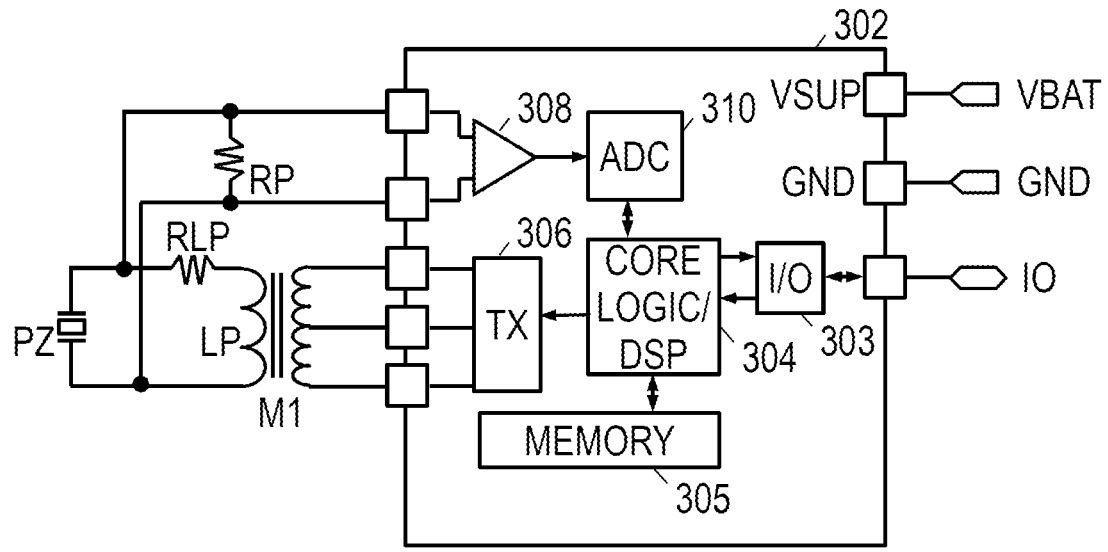
FIG. 3 is a circuit schematic of an illustrative parking-assist sensor.

One potential sensor configuration is now described with reference to FIGS. 3 and 4, though in practice the sensors may employ any of a number of suitable communication and power supply configurations such as those provided in the DSI3, LIN, and CAN standards. Some of these standards support data communication via the power conductors, or via multiple bus conductors.

Sensor controller 302 may be an integrated circuit device packaged for mounting or soldering to a printed circuit board connecting the device contacts to other electronic components or wire connectors. In the illustrative implementation of FIG. 3, the sensor controller 302 connects to two power terminals (Vbat and GND) and a single input/output ("I/O" or "IO") line for bidirectional communication with the ECU 202. The sensor controller 302 includes an I/O interface 303 that, when placed in a recessive mode, monitors the I/O line for communication from the ECU 202; and, when placed in a dominant mode, drives the I/O line to send measurements or other information to the ECU 202.

The sensor controller 302 includes a core logic 304 that operates in accordance with firmware and parameters stored in nonvolatile memory 305 to parse commands from the ECU and carry out the appropriate operations, including the transmission and reception of acoustic bursts. To transmit an acoustic burst, the core logic 304 is coupled to a transmitter 306 which drives a set of transmit terminals on the sensor controller 302. The transmitter terminals are coupled via a transformer M1 to a piezoelectric element PZ. The piezoelectric element PZ has a series resonance frequency set by internal parameters and a parallel resonance frequency established in combination with the transformer's winding inductance LP and any parasitic or added capacitances. The resonance quality factors (Q) depend on the internal parameters, the transformer's winding resistance RLP, and a parallel resistor RP. The resonance frequencies and quality factors are tuned to provide the desired center frequency and bandwidth (e.g., 48 kHz with 15 kHz bandwidth). (Though ultrasonic frequencies are provided here as an example, any acoustic frequency suitable for burst propagation may be employed.)

As used herein, the term "piezoelectric transducer" includes not only the piezoelectric element, but also the supporting circuit elements for driving, tuning, and receiving from, the piezoelectric element. In the illustrative embodiment, these supporting elements are the transformer M1, the parallel resistor, and any tuning or DC-isolation capacitances. Optionally, output and input capacitance of the transmitter 306 and amplifier 308, respectively, may also be included as parasitic characteristics of the supporting circuit elements considered to be part of the transducer. However, the use of the term "piezoelectric transducer" does not necessarily require the presence of any supporting circuit elements, as a piezoelectric element may be employed alone without such supporting elements.

The terminals of the piezoelectric element PZ are coupled to the sensor controller's pair of receive terminals. As the received echo signals are typically in the millivolt or microvolt range, a low-noise amplifier 308 amplifies the signal from the receive terminals. The amplified receive signal is digitized by analog-to-digital converter (ADC) 310 and processed by core logic 304, which may take the form of a digital signal processor (DSP). Core logic 304 applies programmable methods to process the signal from the piezoelectric element to, e.g., measure the reverberation period of the piezoelectric transducer after the transmission of a burst, and to detect and measure the timing of any received burst reflections or "echoes". Such methods may employ filtering, correlation, threshold comparisons, minimum intervals, peak detections, noise level determinations, and other customizable techniques tailored for improving reliability and accuracy. Core logic 304 may further process the amplified receive signal to analyze characteristics of the transducer to detect and diagnose any faults.

Figure 4:
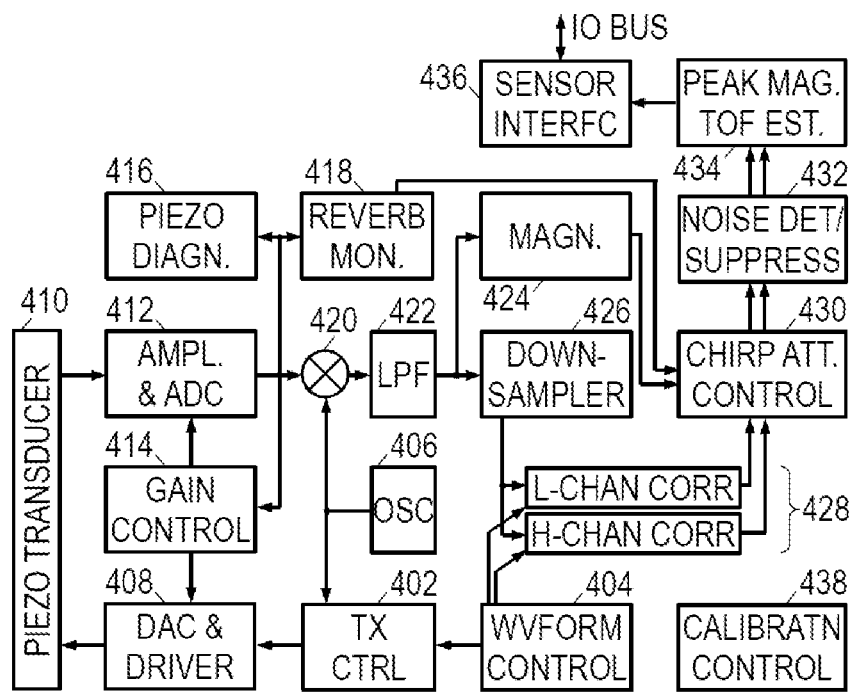
FIG. 4 is block diagram of operations implemented by an illustrative parking assist sensor.

FIG. 4 represents the operations of the sensor controller in block diagram form. A transmit control block 402 combines a waveform template from waveform control block 404 with a carrier signal from a digital carrier generation block 406 to form a digital burst signal. In at least some contemplated implementations, the digital burst signal is a linear frequency modulated chirp lasting about 2.5 milliseconds during which the frequency is swept upward from 7 kHz below the carrier frequency to 1 kHz below the carrier frequency (lower sideband up-chirp), or from 1 kHz above the carrier frequency to 7 kHz above the carrier frequency (upper sideband up-chirp). One or both of the up-chirps can be replaced by down-chirps in which the frequency is swept from the higher value to the lower value. The precise duration and frequency range can be customized, and some contemplated implementations divide the useful transducer frequency range into more than two channels, any one of which may be selected for the transmit control block 402 to employ.

A driver block 408 includes a digital to analog converter (DAC) to convert the digital burst signal into an analog burst signal, and a driver to supply the analog burst signal to the piezoelectric transducer 410 in an impedance-matched fashion. The piezoelectric transducer 410 vibrates in response to the analog burst signal, thereby generating an acoustic burst signal that propagates outward from the transducer. Reflections of the acoustic burst vibrate the piezoelectric element, inducing a detectable analog receive signal. The transducer typically experiences some residual reverberation after the analog burst signal ends, which can potentially interfere with detection of reflections from nearby obstacles.

A receiver block 412 amplifies and digitizes the analog receive signal, producing a digital receive signal. The sampling rate is at least twice the highest expected frequency component in the signal, and preferably more, e.g., 8× when using a successive approximation register (SAR) converter, i.e., 409.6 kHz when using a carrier frequency of 51.2 kHz. If a sigma-delta converter is used, the sampling rate may be much higher, e.g., 10 MHz. Based on the digital receive signal, a gain control block 414 adjusts the gain of the driver block 408 and/or the receiver block 412 to optimize performance while preventing saturation of the receiver block's analog to digital converter (ADC). A diagnostic block 416, alone or in combination with a reverberation monitor block 418, analyzes the digital receive signal to detect and diagnose any transducer fault conditions. Some fault conditions may be indicated by, e.g., an excessively short reverberation periods (which may be due to a disconnected or defective transducer, suppressed vibration, or the like), while others may be indicated by an excessively long reverberation period (defective mounting, inadequate damping resistance, or the like). The diagnostic block 416 may detect and classify multiple such transducer fault conditions, storing the appropriate fault codes in internal registers or nonvolatile memory 305. Commands received via the I/O line trigger the core logic 304 to operate the transmitter and receiver and provide the measurement results to the ECU 202 via the I/O line, potentially accompanied by status bits or fault codes.

Reverberation monitor block 418 detects and signals the end of the transducer reverberation period, as discussed further below. A mixer 420 combines the digital receive signal with the digital carrier signal to downconvert the digital receive signal to a zero intermediate frequency ("ZIF") representation having in-phase and quadrature signal components. A low-pass filter 422 filters the ZIF signal components to exclude modulation byproducts that might otherwise cause aliasing. A magnitude block 424 combines the in-phase and quadrature signal components to obtain a magnitude signal representing the magnitude of the receive signal. A decimation block 426 reduces the sample rate of the low-pass filtered ZIF signal components. If the transducer bandwidth is 5 kHz and the ADC sampling rate is 384 kHz, the decimation block may discard 6 of every 7 samples to reduce the sample rate to 50 kHz.

A correlation block 428 filters the down-sampled ZIF signal components using correlation filters having impulse responses that match the waveform templates for each of the channels, e.g., up-chirps in the upper and lower sidebands. The correlation filters produce channel correlation signals in which the burst echoes are represented as peaks. In some contemplated embodiments, the correlation filters use modified waveform templates (e.g., an up-chirp combined with a Gaussian window function) to narrow the peaks in the correlation signals.

As discussed further below, the correlation filters preferably vary their impulse responses as a function of time elapsed from the end of the reverberation period, enhancing detection performance at short distances while continuing to suppress channel crosstalk at medium or long distances. As one example, the applied window function can be varied to reduce the bandwidth of the chirp waveform as a function of elapsed time. At short distances, the larger bandwidth permits passage of partial echoes. Partial echoes are those whose initial portions arrive before the measurement start time, which corresponds to the end of transducer reverberation. This impulse response variation enables the correlation filters to provide peaks in the correlation signal for these partial echoes. As more time elapses, the partial echoes gradually become full echoes, and the bandwidth of each correlation filter is narrowed to provide better separation between the frequency channels. Interpolation can be used to determine the filter coefficients between the values initially used for correlating with partial echoes and the values used for correlating with full echoes.

However, it should be recognized that any correlation signal peaks associated with partial echoes are attenuated relative to peaks representing full echoes, not only because the partial echoes are shorter but also because their frequency content varies relative to the full echoes. When this effect is combined with the transducer's frequency-dependent response, the channels may become unbalanced, adversely impacting accuracy of distance measurements to close-range obstacles. As discussed further below, chirp attenuation control block 430 may be calibrated by comparing the partial echo peaks to ZIF signal magnitudes, deriving scale factors that can be used to rebalance the channels. Block 430 scales the channel correlation signals based on the time elapsed since the measurement start time, applying a channel-dependent gain to compensate for partial echoes and associated frequency dependence of the transducer response, substantially enhancing short range detection performance. Block 430 may also apply a time dependent gain to compensate for echo attenuation due to propagation to and from the obstacles.

Noise detection/suppression block 432 applies a nonlinear function to the attenuation-compensated channel correlation signals to suppress noise and amplify the peaks representing echoes. In some contemplated implementations, the output of block 432 is supplied to the ECU for further processing. Other contemplated implementations include an echo detection block 434 that detects the peaks in the channel correlation signals, determines the magnitude of the peaks, and calculates the time of flight (or equivalently, determines the distance) associated with each peak. Notably, the time of flight calculation accounts for the delay caused by the correlation filtering operation. Echo detection block 434 stores the magnitude and time of flight information for the echoes detected in each channel in memory 305, enabling sensor interface block 436 to communicate the echo information to the ECU.

When the sensor controller is placed in calibration mode with a standard target (e.g., a 75 mm diameter pole) positioned initially at a predetermined distance that permits correlation with a full echo (e.g., 1.5 m), calibration control block 438 initiates (sequential) transmissions of acoustic bursts in each channel and adjusts the gain of the chirp attenuation control block 430 so that the peak magnitude detected in each channel by echo detection block 434 matches the peak magnitude of the signal calculated by magnitude block 424. The calibration control block 438 further adjusts the correlation filter delay compensation so that the time of flight determined by the echo detection block 434 matches the expected value for the standard target. The standard target is then repositioned at a predetermined distance near the minimum detection distance where the correlation filters employ a wider bandwidth template to operate on a partial echo (e.g., 25 cm), and the calibration process is repeated. Interpolation can be used to set the gain of the chirp attenuation control block 430 between the calibration point for the wider bandwidth waveform template and the point at which the correlators use the narrow bandwidth waveform template, where the gains correspond to the initial calibration.

Figure 5:
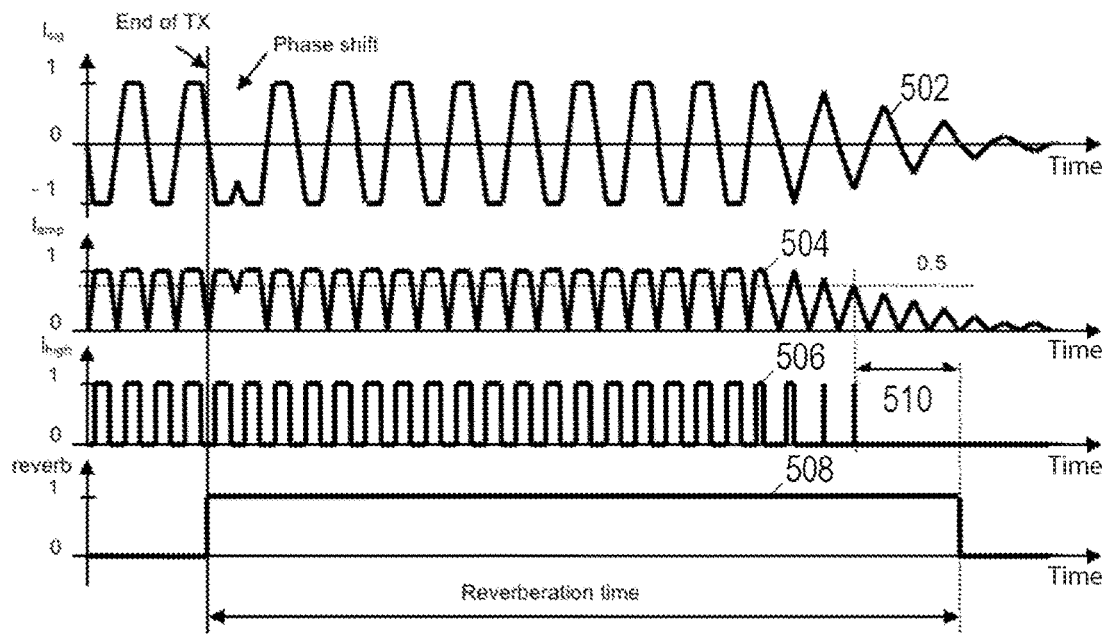
FIG. 5 is a graph of illustrative signals suitable for reverberation sensing.

FIG. 5 is a graph of illustrative signals to demonstrate the reverberation sensing operation of reverberation monitor block 418. The signal are illustrated in rudimentary form; in practice saturation of the receiver is preferably avoided to minimize crosstalk between channels. FIG. 5 shows the digital receive signal 502 during transducer reverberation after the end of an acoustic burst ("End of TX"). The signal exhibits a phase shift as the piezoelectric element transitions from being driven to driving the receive signal ("Phase shift"). The receive signal 502 amplitude decreases as the reverberation decays. The reverberation monitor block 418 determines the absolute value of the receive signal, shown in FIG. 5 as amplitude signal 504. Reverberation monitor block 418 compares the amplitude signal 504 to a predetermined threshold, e.g., half of the peak signal value, using a comparator. The comparator output is high signal 506, which is asserted when the amplitude signal 504 is above the predetermined threshold, and de-asserted when the amplitude signal 504 is below the threshold. High signal 506 is accordingly a series of pulses which gradually decrease in width as the reverberation decays.

Reverberation monitor block 418 begins asserting a reverberation signal 508 when the sensor controller ends the acoustic burst transmission, and continues asserting the reverberation signal for a predetermined debounce interval 510 after the last pulse of high signal 506. Each pulse resets the debounce interval timer. The debounce interval 510 is present to prevent premature end detection due to destructive interference between slightly mismatched serial and parallel resonance frequencies of the transducer. The debounce interval is preferably programmable to values between 60 and 300 microseconds, but other values would also be suitable.

As an alternative to the programmable debounce interval, the reverberation monitor block 418 may determine the reverberation time adaptively over many measurement cycles, to minimize any interference from noise and near echoes on determination of the reverberation time. In other contemplated implementations, the reverberation time is set to a fixed value guaranteed to exceed the damping time for the transducer. For active damping implementations, the reverberation time may be fixed at, e.g., 500 microseconds. For passive damping, the value may be higher. In such implementations, the reverberation monitor 418 signals the end of the reverberation at the preset time after the end of the acoustic burst transmission.

Figure 6:
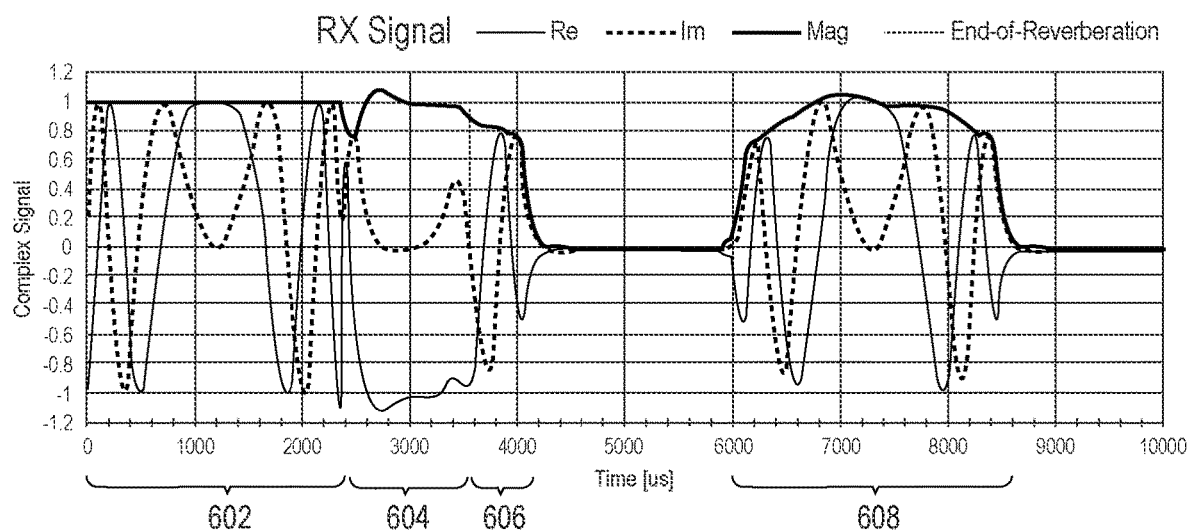
FIG. 6 is a graph of an illustrative downconverted receive signal.

FIG. 6 is a graph of an illustrative signals to demonstrate the downconversion operation implemented by mixer 420 and low pass filter 422, as well as the operation of magnitude block 424. FIG. 6 shows the ZIF signal components and the resulting signal magnitude calculated by magnitude block 424. Due to the frequency sweep (in this case, an up-chirp), the ZIF signal components exhibit changes in phase as the acoustic burst frequency gradually moves from below the carrier frequency to above the carrier frequency during the acoustic burst transmission interval 602. Reverberation interval 604 is partly disguised by an echo returning from a nearby obstacle, in this case about 25 cm away. For comparison, a full echo from an obstacle 1 m away is shown at interval 608.

In this example, the reverberation interval ends 3600 microseconds after the beginning of the acoustic burst transmission, placing only the last 600 microseconds or so (~25%) of the near echo within the measurement interval. The correlation filter impulse response is preferably provided a wider bandwidth to pass this tail portion 606, and the bandwidth narrowed as further time elapses until full echoes can be received. As previously mentioned, the waveform template may include windowing or narrow bandwidth filtering to improve performance, and when partial echoes may be received, the window or filter may be modified to provide a wider bandwidth to pass the frequencies associated with the echo tails.

Figure 7A:
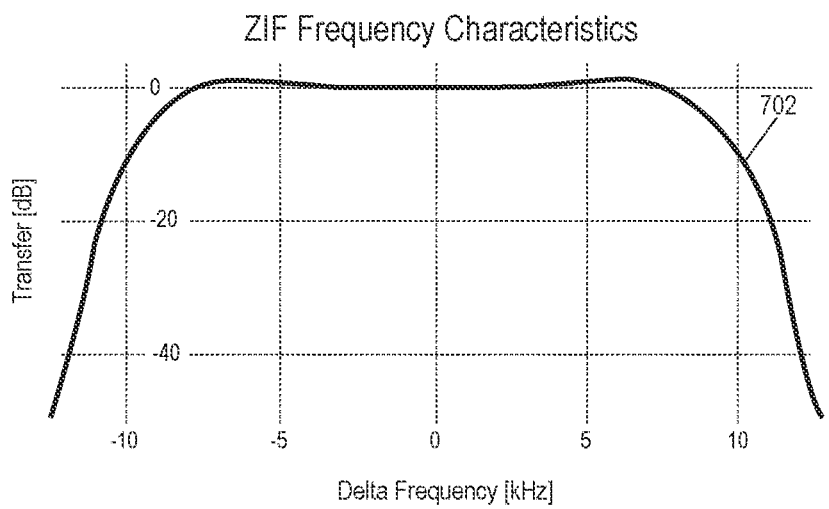
FIG. 7A is a graph of an illustrative sensor frequency dependence.

To illustrate the frequency dependent effects of waveform truncation, FIG. 7A shows a graph of the frequency dependence of an illustrative transducer, after accounting for the digitization and down-conversion operations. The combined transfer function 702 (expressed in decibels) is relatively flat between 7.5 kHz below to 7.5 khZ above the carrier frequency, beyond which the response falls off rapidly, falling below −50 dB at 15 kHz below and above the carrier frequency. There is enough of a slope near the band edges to unbalance the channel responses when the frequency distribution of the truncated waveforms is not symmetric.

Figure 7B:
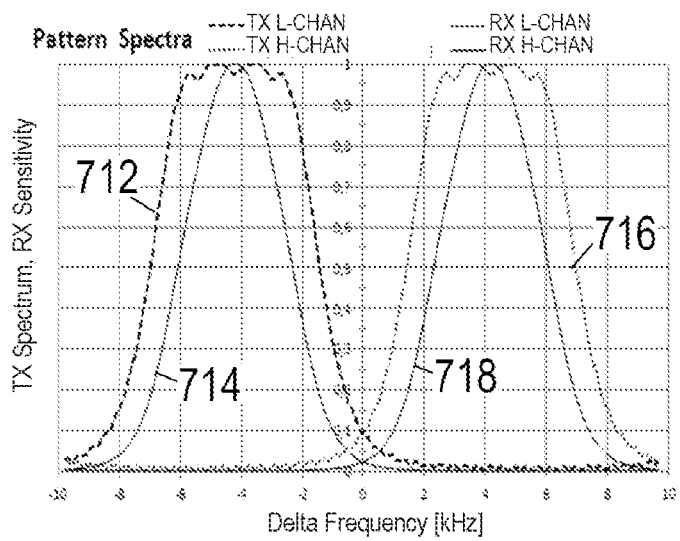
FIG. 7B is a graph comparing illustrative sideband transmit burst spectra to full waveform template spectra.

FIG. 7B shows the lower sideband acoustic burst spectrum 712 (expressed on a linear scale and normalized to unity) as compared with the frequency spectrum of the correlation filter pattern 714 (the narrow bandwidth waveform template for processing full echoes) for the lower sideband. Similarly, the upper sideband acoustic burst spectrum 716 is compared to the frequency spectrum of the correlation filter pattern 718 for the upper sideband correlation filter.

Figure 7C:
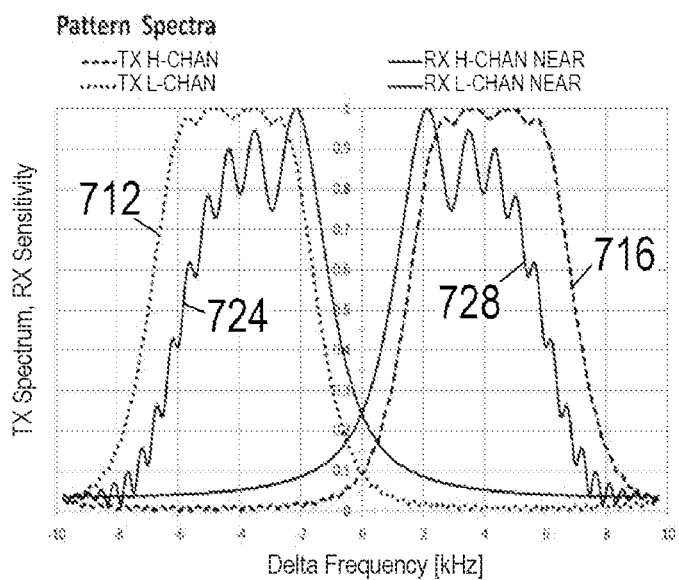
FIG. 7C is a graph comparing illustrative sideband transmit burst spectra to truncated waveform template spectra.

By contrast, FIG. 7C shows a the upper and lower acoustic burst spectrums 712, 716, compared with the frequency spectrum of the correlation filter pattern 724 (the wider bandwidth waveform template for processing partial echoes) for the lower sideband, and the frequency spectrum of the correlation filter pattern 728 for the upper sideband.

Figure 8:
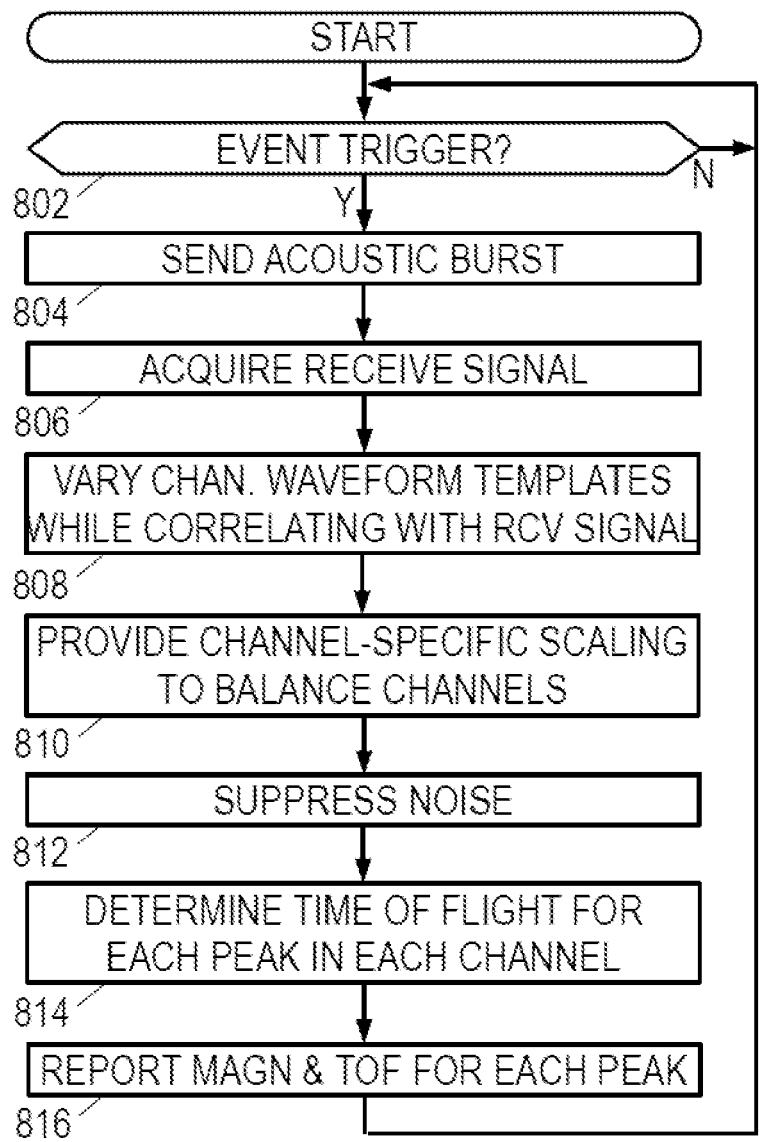
FIG. 8 is a flow diagram for an illustrative sensing method.

FIG. 8 is a flow diagram for an illustrative sensing method. It begins in block 802 with the control logic or interface detecting a measurement command or other indication that a measurement should be made. In block 804, the sensor transmits an acoustic burst in the frequency channel it is assigned, and pauses until the reverberation interval ends. In block 806, the sensor acquires a receive signal potentially including echoes of the acoustic burst as well as potential echoes of acoustic bursts in other frequency channels.

In block 808, the sensor filters the receive signal, using correlation filters using waveform templates for each channel, varying the templates based on time elapsed since the measurement start time, e.g., by interpolating between a wider band waveform template that improves detection of partial echoes from nearby obstacles and a narrowband waveform template that suppresses channel crosstalk for full echoes. In block 810, the sensor adjusts the relative channel gains as a function of elapsed time to compensate for frequency-dependent attenuation associated with partial echo responses. (In the absence of any compensation for such attenuation, the minimum distance detection performance is seen to be significantly degraded.)

In block 812, the sensor applies a nonlinear function to the rebalanced channel correlation signals to suppress noise. In block 814, the sensor (or optionally, the ECU) determines the time of flight for peaks representing echoes and determines the magnitudes of the peaks. In some implementations, measurements from multiple acoustic bursts are combined to increase measurement reliability. In block 816, the sensor (or optionally, the ECU) uses the most recent measurements to update register values regarding the distance of reflectors, for use in providing various driver assistance services.

The above paragraphs disclose, inter alia, the use of side bands to provide multichannel operation of acoustic sensors, thereby achieving strong suppression of cross talk between sensors. Because separate frequency bands are used for measuring time of flight and encoding source identity, each sensor can achieve the same distance performance as a single-sensor system without any loss of resolution, providing all sensors with equal magnitudes and equivalent performance. This characteristic enables the system controller to reliably combine information from different sensors, improving the performance of the system as a whole.

Though the operations shown and described in FIG. 8 are treated as being sequential for explanatory purposes, in practice the method may be carried out by multiple integrated circuit components operating concurrently and perhaps even speculatively to enable out-of-order operations. The sequential discussion is not meant to be limiting. Moreover, the foregoing implementations may omit complicating factors such as parasitic impedances, current-limiting resistors, level-shifters, line clamps, etc., which may be present but do not meaningfully impact the operation of the disclosed circuits. Still further, the focus of the foregoing discussions has been ultrasonic sensors, but the principles are applicable to any acoustic sensors or other pulse-echo transducers that may potentially interfere with each other if operated in parallel. These and numerous other modifications, equivalents, and alternatives, will become apparent to those skilled in the art once the above disclosure is fully appreciated. It is intended that the following claims be interpreted to embrace all such modifications, equivalents, and alternatives where applicable.

What is claimed is:

1. An integrated circuit controller for a sensor, the integrated circuit controller comprising:
   a transmitter to drive a piezoelectric transducer to generate acoustic bursts;
   a receiver to obtain a receive signal from the piezoelectric transducer after each acoustic burst is generated; and
   a processing circuit coupled to the transmitter and to the receiver, the processing circuit configured to apply echo-detection processing to said receive signal, said echo-detection processing including:
      correlating a receive signal with a waveform template to obtain a correlation signal in which echoes would be represented as peaks; and
      varying the waveform template based on time elapsed from a measurement start time.

2. The integrated circuit controller of claim 1, wherein the echo-detection processing further comprises scaling the correlation signal based on time elapsed from the measurement start time.

3. The integrated circuit controller of claim 2, wherein the echo-detection processing further comprises, after said scaling, determining a time of flight associated with any detected peak in the correlation signal.

4. The integrated circuit controller of claim 1, wherein varying the waveform template includes decreasing a bandwidth of the waveform template based on time elapsed from the measurement start time.

5. The integrated circuit controller of claim 4, wherein the echo-detection processing further comprises scaling the correlation signal to compensate for a piezoelectric transducer response to a tail of the acoustic burst received after transducer reverberation ends.

6. The integrated circuit controller of claim 4, wherein the waveform template represents an up-chirp.

7. The integrated circuit controller of claim 4, wherein the waveform template represents a down-chirp.

8. A method that comprises:
   correlating a receive signal with a waveform template to obtain a correlation signal in which echoes would be represented as peaks; and
   varying the waveform template based on time elapsed from a measurement start time.

9. The method of claim 8, further comprising: determining a time of flight associated with any detected peak in the correlation signal.

10. The method of claim 9, further comprising, before said determining, scaling the correlation signal based on time elapsed from the measurement start time.

11. The method of claim 8, wherein varying the waveform template includes varying a bandwidth of the waveform template from wide to narrow.

12. The method of claim 11, further comprising, before determining a time of flight associated with any detected peak in the correlation signal, scaling the correlation signal to compensate for a transducer response to a portion of an acoustic burst received after transducer reverberation ends.

13. The method of claim 11, wherein the waveform template represents an up-chirp.

14. The method of claim 11, wherein the waveform template represents a down-chirp.

15. The method of claim 8, wherein the measurement start time is a debounce interval after a detected end of reverberation.

16. The method of claim 8, further comprising downconverting the receive signal to zero intermediate frequency (ZIF) before said correlating with the waveform template.

17. An acoustic sensor comprising:
   a piezoelectric transducer; and
   an integrated circuit controller that includes:
      a transmitter to drive the piezoelectric transducer to generate acoustic bursts;
      a receiver to obtain a receive signal from the piezoelectric transducer after each acoustic burst is generated; and
      a processing circuit coupled to the transmitter and to the receiver, the processing circuit configured to apply echo-detection processing to said receive signal, said echo-detection processing including:
         correlating a receive signal with a waveform template to obtain a correlation signal in which echoes would be represented as peaks; and
         varying the waveform template based on time elapsed from a measurement start time.

18. The acoustic sensor of claim 17, wherein varying the waveform template includes decreasing a bandwidth of the waveform template based on time elapsed from the measurement start time.

19. The acoustic sensor of claim 18, wherein the echo-detection processing further comprises scaling the correlation signal to compensate for a piezoelectric transducer response to a tail of the acoustic burst received after transducer reverberation ends.

\* \* \* \* \*